United States Patent [19]
Bright et al.

[11] Patent Number: 5,404,403
[45] Date of Patent: Apr. 4, 1995

[54] KEY MANAGEMENT IN ENCRYPTION SYSTEMS

[75] Inventors: Michael W. Bright, Arlington Heights; David L. Weiss, Roselle; Kevin M. Cutts, Schaumburg; Robert J. Locascio, Crystal Lake, all of Ill.

[73] Assignee: Motorola, Inc., Schaumburg, Ill.

[21] Appl. No.: 942,864

[22] Filed: Nov. 12, 1991

Related U.S. Application Data

[63] Continuation of Ser. No. 583,268, Sep. 17, 1990, abandoned.

[51] Int. Cl.⁶ .................................................. H04L 9/00
[52] U.S. Cl. .................................... 380/21; 380/49; 380/50
[58] Field of Search ................. 380/21, 23, 24, 25, 380/43–45, 47, 49, 50

[56] References Cited

U.S. PATENT DOCUMENTS

| | | | |
|---|---|---|---|
| 4,228,321 | 10/1980 | Flanagan | 380/21 |
| 4,440,976 | 4/1984 | Bocci et al. | 380/1 |
| 4,549,308 | 10/1985 | LoPinto | 380/21 |
| 4,578,531 | 3/1986 | Everhart et al. | 380/21 |
| 4,605,820 | 8/1986 | Campbell, Jr. | 380/24 |
| 4,755,940 | 7/1988 | Brachtl et al. | 380/24 X |
| 4,850,017 | 7/1989 | Matyas, Jr. et al. | 380/21 |
| 4,876,716 | 10/1989 | Okamoto | 380/21 |
| 4,882,751 | 11/1989 | Kotzin et al. | 380/9 |
| 4,912,762 | 3/1990 | Lee et al. | 380/24 |
| 4,927,789 | 5/1990 | Shirley, Jr. et al. | 455/67 |
| 4,965,804 | 10/1990 | Trbovich et al. | 380/21 |
| 4,993,069 | 2/1991 | Matyas et al. | 380/23 |

OTHER PUBLICATIONS

*The Oxford English Dictionary*; (Second Ed., 1989; Clarendon Press; Oxford, U.K.; vol. IV, pp. 95–96).

*Primary Examiner*—Bernarr E. Gregory
*Attorney, Agent, or Firm*—Susan L. Lukasik; Steven G. Parmelee

[57] ABSTRACT

A key management system for encryption keys removes the effect of secure communications loss during a rekey period in a secure communications system. Use of key indexes to partition encryption keys into usable subgroups such that during a rekey period, continuous secure communications are maintained throughout the entire secure communications system.

14 Claims, 3 Drawing Sheets

KEY MANAGEMENT IN ENCRYPTION SYSTEMS

This is a continuation of application Ser. No. 07/583,268, filed Sep. 17, 1990, now abandoned.

FIELD OF THE INVENTION

This invention is concerned with encrypted communication systems. More particularly, this invention is concerned with key management in an encrypted communication system.

BACKGROUND OF THE INVENTION

Encrypted voice and data systems are well known. Many of these systems provide secure communication between two or more users by sharing one piece of information between the users, which permits only those users knowing it to properly decrypt the message. This piece of information is known as the encryption key variable, or key for short. Loading this key into the actual encryption device in the secure communication unit is a basic requirement that allows secure communication to occur. To retain security over a long period of time, the keys are changed periodically, typically weekly or monthly.

As systems grow larger, with thousands of subscriber units in one system, the need for multiple keys becomes evident. In secure RF trunked systems, such as the system described in U.S. Pat. No. 4,882,751, it is often likely that different groups within a large system require their own encryption key or keys, possibly to increase internal security or to minimize the number of times it is necessary to reload keys over a period of time.

Loading new keys, called rekeying, can be done in various ways. Over-the-channel rekeying is achieved by transmitting the encrypted keys from a central keyloading site either individually or simultaneously to all units in the subscriber group over a typical secure channel. Manual rekeying is accomplished by plugging a cable from a hand-held keyloading device, also called a keyloader, to the secure unit and downloading the keys from the keyloader into the subscriber unit by pressing the appropriate buttons on the keyloader. Over-the-channel rekeying takes about one second, and manual loading takes about one minute per unit.

No matter how rekeying is done, whether by over-the-channel rekeying or by manual rekeying, there is always a time when some subscribers have the new set of keys and the remaining subscribers from the same group have the old set of keys preventing them from secure communication with each other. Keyloading cannot be accomplished in all units simultaneously for many reasons. In over-the-channel loaded systems, a subscriber unit must be powered up to be rekeyed. In manual loaded systems, the process requires a finite time that can last several days or even weeks for large systems. In either case, the users within a subscriber group cannot talk to each other all the time, thus creating a period when secure communication in the system is not possible. As shown in the example in TABLE 1, secure communication is not possible throughout the entire system until the third day of the rekey period when all radios have been rekeyed. Thus two to three entire days have gone by when full secure communication is lost.

The time span required to rekey an entire system is called the rekey period. Clearly, it is imperative that the rekey period be minimized. Realistically, rekey methods today do not allow the rekey period to be negligible to a user system. To simply rush the keyload process for a system is unrealistic; it is necessary that the transition between key changes be smooth. Thus, a new approach to managing encryption keys to minimize lost secure communication time due to long rekey periods is essential.

TABLE 1

| | Number of Radios Rekeyed | Sun. | |←Rekey Period→| | | |
|---|---|---|---|---|---|
| | | | Mon. | Tues. | Wed. |
| Monday | 100 | Key 1 | Key 2 | Key 2 | Key 2 |
| Tuesday | 100 | Key 1 | Key 1 | Key 2 | Key 2 |
| Wednesday | 100 | Key 1 | Key 1 | Key 1 | Key 2 |

SUMMARY OF THE INVENTION

Therefore, the present invention solves the problem of managing encryption keys to minimize lost secure communication time due to long rekey periods. This invention encompasses a key management system for encrypted information. Multiple encryption keys are stored for use in the encryption/decryption process. The multiple encryption keys are divided into at least two indexes. The at least two indexes are retained as at least one active index and at least one inactive index.

DESCRIPTION OF A PREFERRED EMBODIMENT

Figure 1:
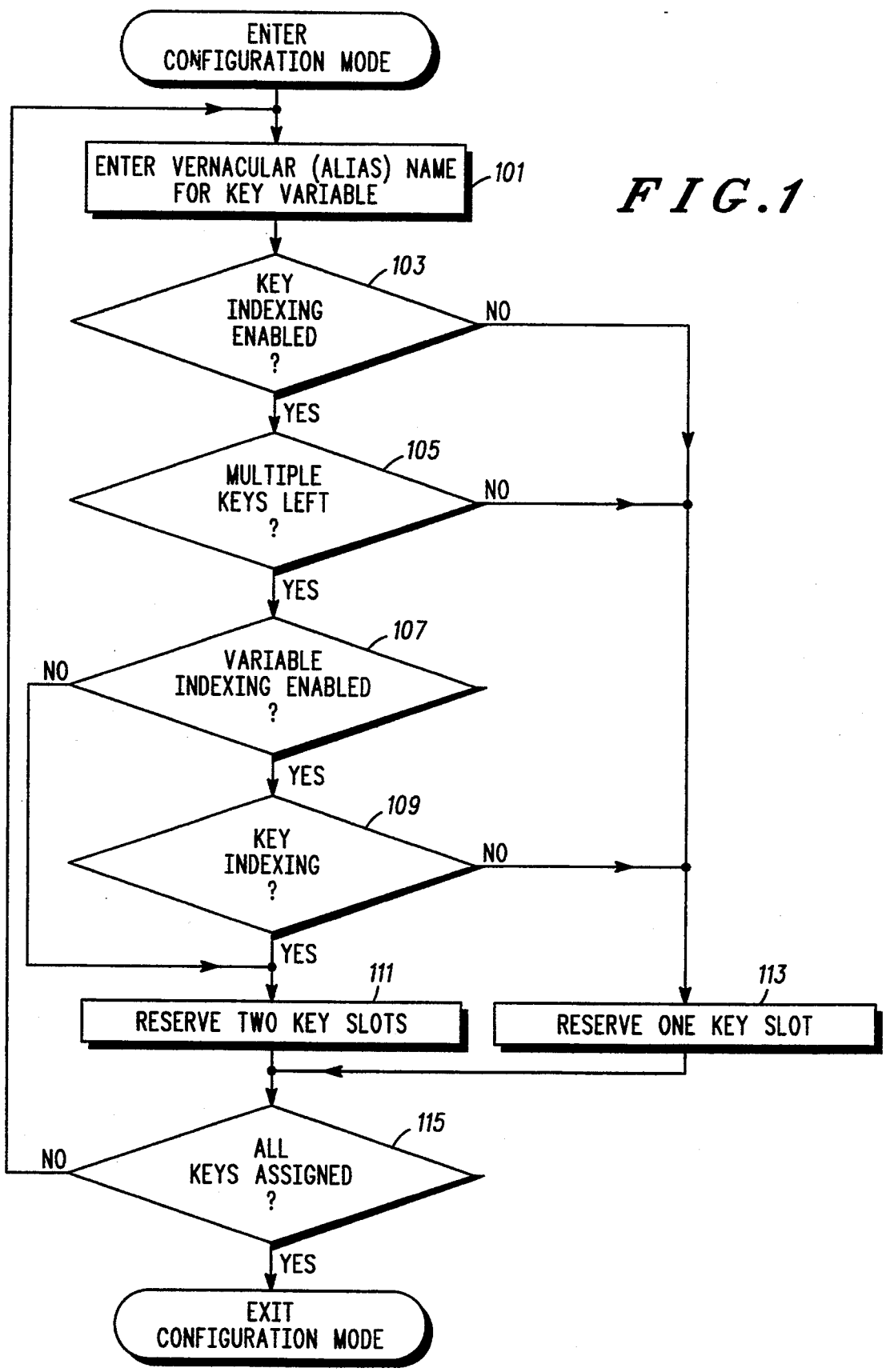
FIG. 1 is a flowchart illustrating the configuration procedure for the subscriber units when supporting Key Indexing in accordance with the invention.

The following describes a key management system encompassing the apparatus and method of Key Indexing, a process of partitioning the available set of encryption keys into usable subgroups in order to maintain continuous secure communication throughout rekey periods. In the preferred embodiment of the invention, an encryption key is an entire key, key fragment or other key representation used to derive an encryption key.

Key Indexing will function for any multikey system, including but not limited to conventional and trunked communication systems. The user needs an encrypting/decrypting unit, for example, a mobile radio with multiple key ability, such as a Syntor X 9000 with the multikey option, or a portable radio, such as a Systems Saber with the multikey option, both available from Motorola, Inc.

Key Indexing devises a medium for the user to partition his keys into two smaller groups, each containing an equal number of keys. The two indexes are called the active index (the index containing the keys currently being used) and the rekey index, also referred to as the inactive index. The indexes, as well as the physical slots (the actual locations where the keys are stored), such as in RAM, are known to the radio's secure microprocessor, such as an MC68HC11 microprocessor, available from Motorola, Inc. During the rekey period, the user communicates in the secure mode using his active index while the rekey manager, or the person responsible for loading the keys into the system, loads new keys into the inactive index. At the end of the current crypto period (the time the keys are valid for use), the radio users select the rekey index as the active index by entering that command on the radio keypad. The microprocessor receives this command, and in RAM, changes the rekey index to the active index, and the previous active index becomes the rekey index. Key Indexing thus tolerates the rekey period to be as long as the crypto period, effectively removing the need for the rekey period to be short.

For example, consider the 8-key system shown in TABLE 2. The 8 keys are split up into two indexes, each containing 4 keys. The radio user can "see" 4 keys, the Blue, Green, Red, and Black key, no matter which index is selected. The secure system is operating on the active index (Index A). The rekey manager can load new keys into the rekey index (Index B) anytime during the crypto period while allowing the system to operate in the secure mode. At the beginning of the next crypto period (e.g., 1 week, 1 month), the user changes the index to reflect the new group of keys via the radio keypad. This operation allows smooth transition between key changes.

Refer to the example in TABLE 3. On Monday, the key manager changes the keys in Index B for 100 of the users. On Tuesday, he rekeys Index B for another 100 units. On Wednesday, Index B for the last 100 units is rekeyed. Throughout the entire rekey period, all the users were able to operate in the secure mode using Index A. On Thursday, the radio operators of the 300 radios switch to the new index at a preset time, say at 6:00 am or whenever the radio is turned on. At this time, Index B becomes the active index, and Index A becomes the rekey index. Referring again to TABLE 1, it can be seen that the system in TABLE 1 shows 3 days where secure communication is not possible throughout the whole system. The system using Key Indexing in TABLE 3 does not have a period of time when secure communication is not possible.

Another advantage of Key Indexing allows the user to identify the same key in both indexes by a single vernacular name, as shown in TABLE 2. In this situation, the user does not need to know that during one crypto period he is using the key in physical slot 2 and on the next crypto period he is using the key in physical slot 3. The user only needs to know that he is using the Green key.

As an enhancement, the keys do not have to be split up into two groups of equal size. The user can partition his keys into subgroups, each containing 1 or 2 keys. The first key in each subgroup is in the first index group (Index 1) and the second key of each subgroup is in the second index group (Index 2). All of the keys associated with the first index are used when Index 1 is selected. Similarly, all the keys associated with the second index are used when Index 2 is selected. If a subgroup contains only 1 key, then the key associated to that subgroup is not indexed and is always selected. This mode of operation is defined as Variable Key Indexing, where keys are a member of more than one index.

TABLE 4 shows an example of Variable Key Indexing. In this example, the Blue, Red and Black keys are indexed; the Green and the Purple keys are not indexed. To the radio user, it appears that he has five keys instead of just four. Index A uses the keys in physical slots 0, 2, 3, 5, and 7. Index B uses the keys in physical slots 1, 2, 4, 6, and 7. With this example, Key Indexing allows smooth transition between key changes on the Blue, Red, and Black keys, but not on the Green and Purple Keys. This is beneficial for the users that need more keys, but do not change some of the keys all the time, or it does not matter that they cannot communicate with a particular key during the rekey period. This may be the case where a key is used only for special operations that last for a few days and then the key is zeroized.

Although the details are not described here, it is possible to set up a three or more index groups, if the user desires.

FIG. 1 is a flowchart illustrating the configuration procedure for the subscriber units when supporting Key Indexing in accordance with the invention. The multiple key variables are divided (assigned) into indexes according to the following procedure. The user enters 101 a vernacular name for the key variable. If key indexing is not enabled 103, then one key slot is reserved 113 for each vernacular name entered. If key indexing is enabled 103, and there is only one physical key slot remaining 105, then one key slot is reserved 113 for the vernacular name entered. If there is more than one slot remaining 105 and Variable Key Indexing is not enabled 107, then two slots are reserved 111 for the vernacular name entered. If Variable Key Indexing is enabled 107 and the key is not to be indexed 109, then one key slot is reserved 113 for the vernacular name entered. If the key is to be indexed 109, then two key slots are reserved 111 for the vernacular name entered. This procedure is repeated until all the key variables slots have been assigned 115 to an index.

Figure 2:
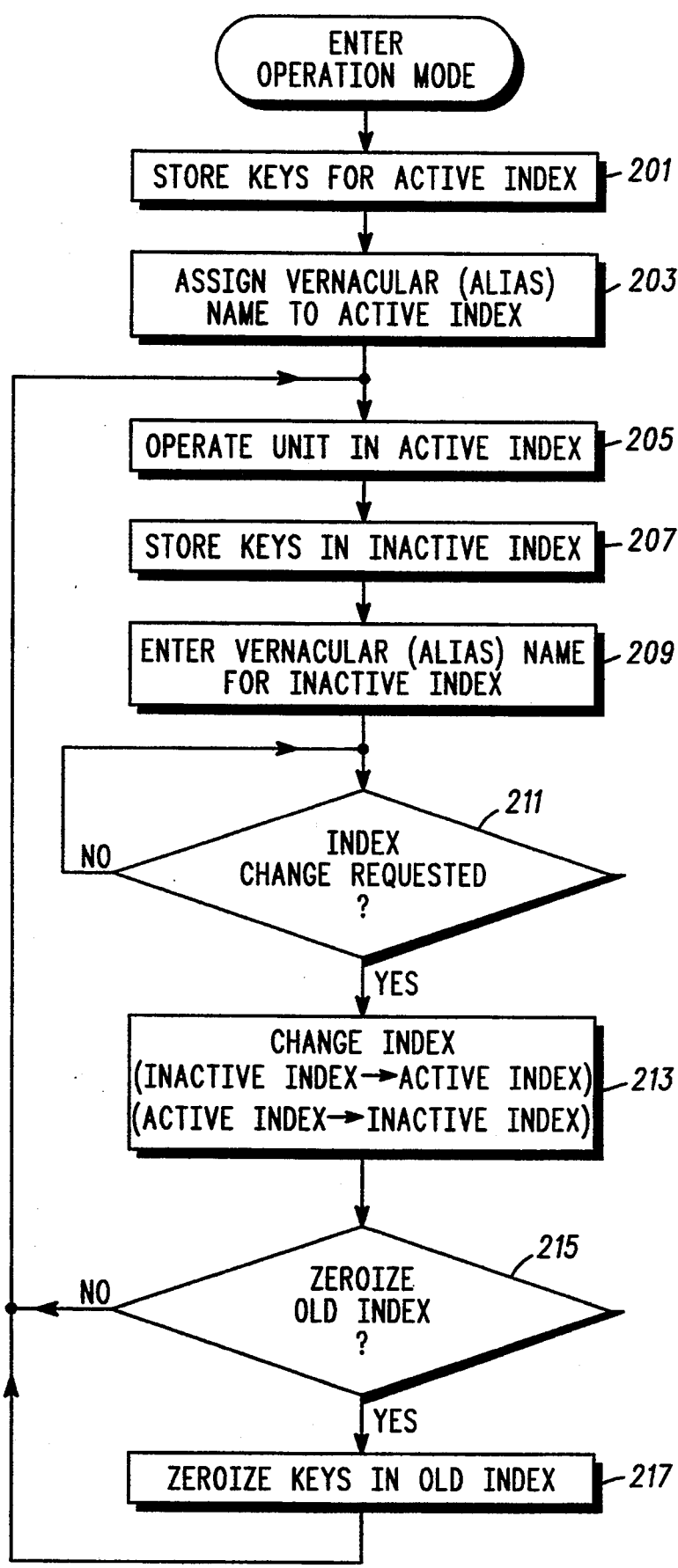
FIG. 2 is a flowchart illustrating Key Indexing in accordance with the invention.

FIG. 2 is a flowchart illustrating Key Indexing in accordance with the invention. Multiple encryption keys are stored 201 in the active index. In addition, a vernacular name is assigned 203 to the active index. The subscriber unit operates 205 using the keys in the active index. New keys are then stored 207 in the inactive index. A vernacular name for the inactive index is entered 209 while the new key variables are stored. When the index change is requested 211 from the user, the active index becomes 213 the inactive index and the inactive index becomes the active index. If the radio has the option enabled 215 to zeroize the keys stored in the old index (now the inactive index), then the keys in the old index are zeroized 217.

Figure 3:
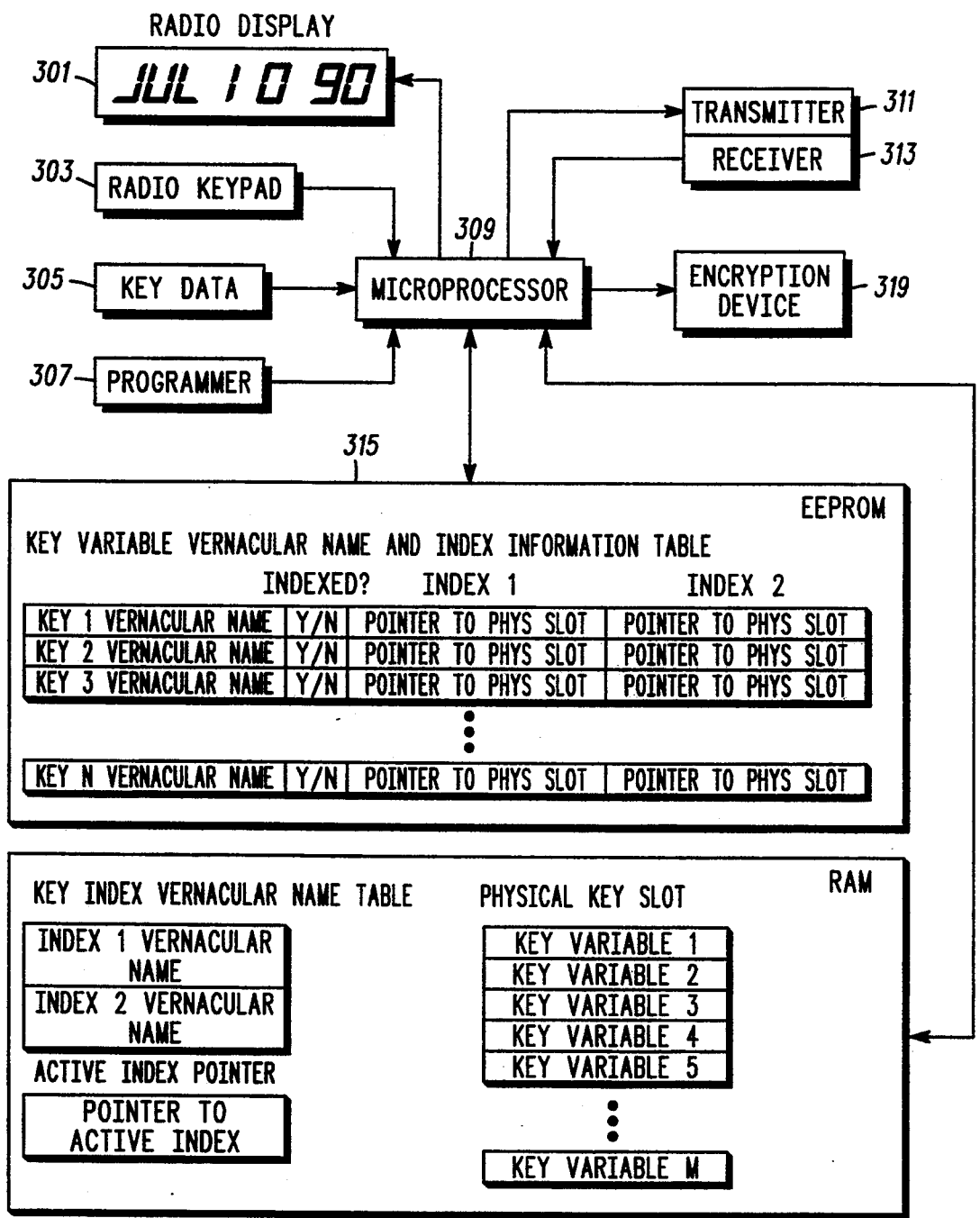
FIG. 3 is a block diagram of a Key Indexing system in accordance with the invention.

A block diagram of a Key Indexing system in accordance with the invention is shown in FIG. 3. During configuration, the programmer 307 enters the vernacular name for each key, whether the key is indexed or not (Variable Key Indexing), and pointers to the physical slot where the key variable will be stored for each index into the microprocessor 309. Note that the pointers are not actually stored, but are calculated when needed by the microprocessor 309. The microprocessor 309 takes the key names and indexing information and stores the data in EEPROM 315. Key data 305, such as the actual encryption key and the key index vernacular name, is entered into the microprocessor 309. The microprocessor 309 then enters the keys and index names into tables in RAM 317. Manipulating the radio keypad 303, the user selects the index to be used. The microprocessor interprets this command and retrieves the index vernacular name from RAM 317 and displays it on the radio display 30 1. The microprocessor 309 selects the proper key from RAM 317 and downloads it into the encryption device 319, thus allowing the user to communicate in a secure manner. When the user begins the transmission 311, the vernacular name for the key being used is displayed on the radio display 30 1 temporarily. When the user wishes to change indexes, he uses the radio keypad 303 to request the change, and the microprocessor 309 switches the rekey index to the active index and zeroizes the keys (if enabled) in RAM 317 from the previous active index.

The microprocessor 309 of FIG. 3 stores the information in TABLE 4 in RAM 317 by the following procedure. The Blue key is stored in Physical Slot 0. The key name for Physical Slot 0 is labelled Blue, it is retained in the active index, and the index name is Index A. Physical Slot 1 holds the rekey information for the next Blue key. The key name is labelled Blue, it is retained in the inactive index, and the index name is Index A. Physical Slot 2 holds the key information in the Green key. The key name is labelled Green, it is retained in the active index, and the index name is Index A and Index B. The remainder of the information in TABLE 4 is stored in a similar manner.

As a second enhancement, each index has an index name. The index name is, for example, an 8 character alias name for the index. The default names are INDEX 1 and INDEX 2. The index name allows the users to easily determine if they are operating on the correct index. The index name is sent to the radio display 301 by the microprocessor 309 whenever the user goes into the secure mode or upon user request through the radio keypad 303. For example, Index A has index name JAN 7 and Index B has index name JAN 14, where the index name corresponds to an expiration date. The users know that they must change to Index B on January 8th. If on January 15th a user changes indexes back to Index A and the index name is still JAN 7, then he knows that he does not have the current keys and must get rekeyed.

In the preferred embodiment of the invention, the index name can be changed in two ways. The index name is changed by an over-the-channel rekeying message when the keys for the rekey index are being updated. The index name can also be entered by a KVL (Key Variable Loader), a type of keyloader, such as a T3011CX available from Motorola, Inc., at the same time the keys are loaded into the rekey index. In either case, the index name is part of the key data 305 that enters the microprocessor 309 for entry into the RAM 317.

Index zeroization provides for increased security when using key indexing. The microprocessor 309 zeroizes (erases) the keys stored in the old index automatically when the new index is selected. This causes unused keys to be zeroized after their crypto period has expired, thus preventing previous communications which may have been recorded from being compromised if the radio is lost or stolen. Index zeroization reduces the risk to previous communications encrypted with keys in the previous index due to a lost or stolen radio.

TABLE 2

| Key Name | Index A (Active) | Index B (Rekey) |
|---|---|---|
| Key 1 (Blue) | Phys Slot 0 | Phys Slot 1 |
| Key 2 (Green) | Phys Slot 2 | Phys Slot 3 |
| Key 3 (Red) | Phys Slot 4 | Phys Slot 5 |
| Key 4 (Black) | Phys Slot 6 | Phys Slot 7 |

TABLE 3

| | Number of Radios Rekeyed | Active Index | ←Rekey Period→ | | |
|---|---|---|---|---|---|
| | | | Mon. | Tues. | Wed. |
| Monday | 100 | A | Index B Rekeyed | | |
| Tuesday | 100 | A | | Index B Rekeyed | |
| Wednesday | 100 | A | | | Index B Rekeyed |
| Thursday | | B | | | |

TABLE 4

| Key Name | Index A (Active) | Index B (Rekey) | Key Group |
|---|---|---|---|
| Key 1 (Blue) | Phys Slot 0 | Phys Slot 1 | Group 1 |
| Key 2 (Green) | Phys Slot 2 | | Group 2 |
| Key 3 (Red) | Phys Slot 3 | Phys Slot 4 | Group 3 |
| Key 4 (Black) | Phys Slot 5 | Phys Slot 6 | Group 4 |
| Key 5 (Purple) | Phys Slot 7 | | Group 5 |

We claim:

1. A key management system for use in a secure communications system having at least two communication units, the system comprising:
   means for storing at least a first encryption key in an active index;
   means for operating a communication unit from said active index during a first cryptographic period, wherein said communication unit is one of the at least two communication units;
   means for storing at least a second encryption key in an inactive index during said first cryptographic period; and
   means for changing to operation of said communication unit from said inactive index during a second cryptographic period.

2. The key management system of claim 1 further comprising
   means for naming said at least two indexes with a vernacular name.

3. The key management system of claim 1 further comprising
   means, coupled to said means for dividing, for variable key indexing.

4. The key management system of claim 1 further comprising
   means, coupled to said means for retaining, for index zeroizing.

5. A method for key management for use in a secure communications system having at least two communication units, comprising the steps of:
   storing at least a first encryption key in an active index;
   operating a communication unit from said active index during a first cryptographic period, wherein said communication unit is one of the at least two communication units;
   storing at least a second encryption key in an inactive index during said first cryptographic period; and
   changing to operation of said communication unit from said inactive index during a second cryptographic period.

6. The method of claim 5 further comprising the step of naming said at least two indexes with a vernacular name.

7. The method of claim 5 further comprising the step of variably indexing at least one of said multiple encryption keys, in response to said step of dividing.

8. The method of claim 5 further comprising the step of index zeroizing, in response to said step of retaining.

9. A key management system for use in a secure communications system having at least two communication units, comprising:
- means for storing at least a first encryption key in an active index;
- means for operating a communication unit from said active index during a first cryptographic period, wherein said communication unit is one of the at least two communication units;
- means for storing at least a second encryption key in an inactive index during said first cryptographic period;
- means for changing to operation of said communication unit from said inactive index during a second cryptographic period;
- means, coupled to said means for dividing, for variable key indexing; and
- means, coupled to said means for retaining, for index zeroizing.

10. The key management system of claim 9 further comprising
- means for naming said at least two indexes with a vernacular name.

11. A method for key management for use in a secure communications system having at least two communication units, comprising the steps of:
- storing at least a first encryption key in an active index;
- operating a communication unit from said active index during a first cryptographic period, wherein said communication unit is one of the at least two communication units;
- storing at least a second encryption key in an inactive index during said first cryptographic period;
- changing to operation of said communication unit from said inactive index during a second cryptographic period;
- variably indexing at least one of said multiple encryption keys, in response to said step of dividing; and
- index zeroizing, in response to said step of retaining.

12. The method of claim 11 further comprising the step of naming said at least two indexes with a vernacular name.

13. A secure communication unit for use in a secure communications system, wherein the subscriber uses a key management system, comprising:
- means for storing at least a first encryption key in an active index;
- means for operating a communication unit from said active index during a first cryptographic period;
- means for storing at least a second encryption key in an inactive index during said first cryptographic period;
- means for changing to operation of said communication unit from said inactive index during a second cryptographic period;
- means, coupled to said means for dividing, for variable key indexing; and
- means, coupled to said means for retaining, for index zeroizing.

14. The secure communication unit of claim 13 further comprising
- means for naming said at least two indexes with a vernacular name.

* * * * *